United States Patent [19]
Hampl

[11] 3,765,245
[45] Oct. 16, 1973

[54] DYNAMO ERGOMETER
[75] Inventor: Franz Hampl, Hochberg, Germany
[73] Assignee: Erich Jaeger, Wurzburg, Germany
[22] Filed: Dec. 31, 1970
[21] Appl. No.: 103,268

[52] U.S. Cl. .................................................. 73/379
[51] Int. Cl. ............................ A61b 5/00, G01l 5/02
[58] Field of Search .................... 73/379; 128/2.05 R

[56] References Cited
UNITED STATES PATENTS

| | | | |
|---|---|---|---|
| 3,447,065 | 5/1969 | Kuhn | 322/32 X |
| 3,505,992 | 4/1970 | Jaeger | 128/2 S |
| 3,568,037 | 3/1971 | Solihull et al. | 322/91 X |
| 3,057,201 | 10/1962 | Jaeger | 73/379 R |
| 3,589,193 | 6/1971 | Thornton | 73/379 R |
| 3,395,698 | 8/1968 | Morehouse | 128/2.05 R |

FOREIGN PATENTS OR APPLICATIONS
1,462,526  11/1966  France .............................. 73/379 R Primary Examiner—James J. Gill
Attorney—Spencer & Kaye

[57] ABSTRACT

A dynamo ergometer having an electrical generator, preferably a self excited a.c. or d.c. generator, which is driven in a conventional manner by means of a driving device e.g., a pedal arrangement, by a patient, a load for absorbing the electrical energy put out by the generator and a control circuit for regulating the electrical energy absorbed or dissipated by the load to a value such that the physical energy transmitted to the driving device by the patient has an adjustable value which is substantially independent of the speed of the generator. The control circuit derives its operating power from the output of the generator and regulates the energy absorbed by the load by varying the load, on the generator.

17 Claims, 5 Drawing Figures

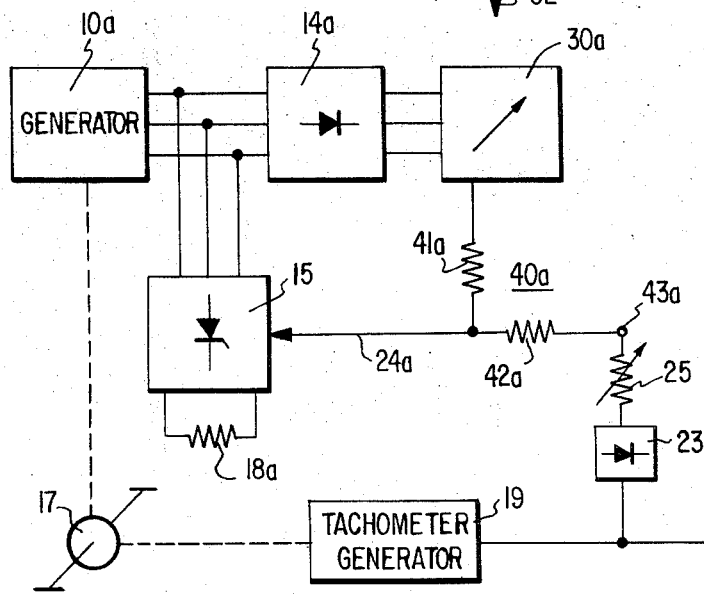

INVENTOR
Franz Hampl
BY Spencer & Kaye
ATTORNEYS.

DYNAMO ERGOMETER

BACKGROUND OF THE INVENTION

The present invention relates to a dynamo ergometer with a device for driving an electric generator by a patient to be examined, a load for absorbing the electrical energy output of the generator and an electrical control circuit which regulates the electric energy absorbed by the load to a value in which the physical energy transmitted from the patient to the drive means has an adjustable value which is practically independent of the generator speed.

In the known dynamo ergometers e.g. see U.S. Pat. No. 3,057,201, and Swiss Pat. No. 432,045, a d.c. generator is generally utilized whose armature winding is connected with a constant invariable load resistance and whose field current is regulated by an electronic control circuit in such a manner that the energy output by the patient, which can be preset by the examining physician, is as independent as possible of the drive speed of the generator.

In these known dynamo ergometers the electronic circuit for controlling the field current, as well as other auxiliary devices such as indicator lamps and the like, are supplied with operating power from the a.c. net. Although the use of the a.c. net power for this purpose would appear to present no problem, in practice, however, considerable drawbacks result due to the fact that ergometers are often used together with other electrical test instruments, such as electrocardiographs or electrical instruments for measuring blood pressure, pulse, etc, which instruments are very sensitive to interferences from the net. This is particularly true when the instruments work with biological body potentials directly derived from a human being. It is therefore often necessary to ground the patient, whereby it quite often becomes necessary to circumvent the electrical safety regulations, in order to avoid ground loops. Accordingly, aside from the danger of producing interference in the sensitive instruments by the alternating voltage of the net, there is thus the additional danger of accidents caused by the alternating voltage.

SUMMARY OF THE INVENTION

It is therefore the object of the present invention to eliminate these above mentioned drawbacks. This is accomplished, according to the present invention, by providing an ergometer wherein the operating current requirement of the ergometer is met by the output of the generator driven by the patient. Specifically, the current supply of the electrical control device is derived from the ergometer generator output.

It should be noted that the known dynamo ergometers are not directly suited for providing their entire electrical energy from their own generators since their current consumption is at a maximum when the drive speed of the generator, with a high desired or adjusted output, has a very low value. In order to avoid any connection to the a.c. line or net, with a dynamo ergometer according to the present invention, a generator is preferably employed whose field is produced entirely or predominantly by a permanent magnet, e.g., a self excited d.c. or a.c. generator. Preferably an a.c. generator is employed since the mechanical friction losses are particularly low.

BRIEF DESCRIPTION OF THE DRAWINGS

FIG. 1 is a basic block diagram of the dynamo ergometer according to the invention.

FIG. 2 is a circuit diagram of a portion of a dynamo ergometer according to one embodiment of the present invention.

FIG. 3 is a block circuit diagram of a second embodiment of the present invention.

DESCRIPTION OF THE PREFERRED EMBODIMENTS

Figure 4:
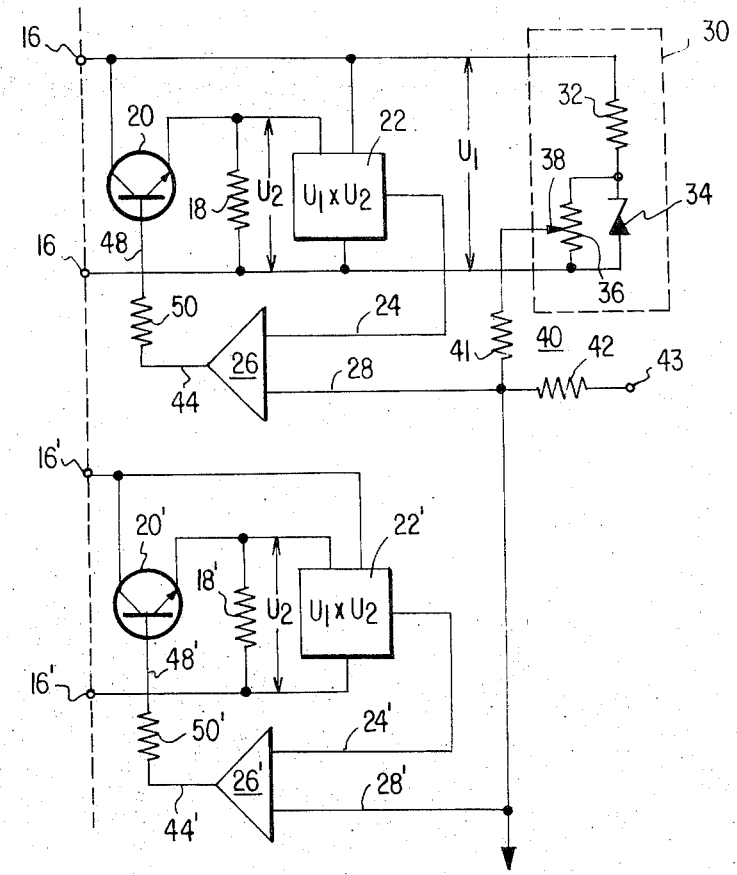
FIG. 4 shows a modification of the embodiment of FIG. 2.

Referring now to FIG. 1 there is shown the basic dynamo ergometer according to the invention, which comprises essentially a device 1 driven by the patient, a generator 2 driven by the device 1, a generator load 3 and a control circuit 4 for controlling the load so that the desired amount of energy generated by the generator 2 is dissipated. The device 1 may comprise any of those devices commonly utilized in dynamo ergometers, for example, the pedal arrangement of the above-mentioned U.S. patent, while, as mentioned above the generator 2 maybe a d.c. generator as illustrated or an a.c. generator. Preferably the generator is self excited, i.e., no connection to the a.c. net to provide a field current is required.

The load resistance 3 is connected across the output terminals of the generator 2. Also connected across the output terminals of the generator 2 is the control circuit 4 which derives its power from the generator 2 and regulates the load resistance to the desired value. The inputs to the control circuit 4 in order to achieve the desired regulation will be discussed below with respect to specific embodiments of the invention.

FIG. 2 shows only a portion of the generator and the control circuit according to a first specific embodiment of the invention, the other portions of the ergometer being designed in a known manner.

Generator 10 is a three-phase generator having a permanent magnet armature and three stator windings of which only two stator windings 12 and 12' are illustrated. Connected to the winding 12 is a rectifier circuit, e.g. a full-wave rectifier bridge 14, having d.c. output terminals 16. The load resistance for the generator 10, which consists of the series connection of a fixed heavy duty resistor 18 and a controllable variable resistance device 20, is connected across the terminals 16. Although other controllable variable resistance devices may be utilized, preferably as illustrated the controllable device is a low frequency heavy duty transistor having its emitter-collector path in series with the resistance 18. Thus resistor 18 and transistor 20 serve as a variable load for absorbing and destroying the electric energy produced by the generator winding 12.

In order to control or regulate the load resistance 18,20 according to this embodiment of the invention, a signal proportional to the energy dissipated in the load resistance 18,20 is required. The electric energy dissipated (i.e. converted into heat) in the load 18, 20 is the product of the voltage applied at terminals 16 and the current flowing through load 18,20. An electrical signal corresponding to this energy is produced by means of a multiplier circuit 22 which has one input thereof connected with the terminals, 16, and the other input thereof connected with the ends of the fixed resistance 18. The same voltage $U_1$ is applied to terminals 16 and to load 18,20, whereas the voltage $U_2$ across the heavy duty fixed resistor 18, is proportional to the current flowing through load 18,20. The multiplier circuit 22 furnishes an output signal on line 24 which is proportional to the product $U_1 \times U_2$ and thus to the electrical energy converted to heat in the load.

Line 24 is connected with one input of a difference amplifier 26 whose other input is provided with a voltage which corresponds to the desired electrical energy to be produced by the generator via a line 28 which is connected to the output of a summation circuit 40 consisting of resistors 41 and 42. To the resistor 41 is applied a voltage signal corresponding to the physical energy to be expended by the patient using the ergometer. This voltage is produced by a variable voltage source 30 which may, e.g., be a battery. Preferably as shown, the voltage source 30 consists of a resistor 32 and a zener diode 34 connected in series across the output terminals 16, and a potentiometer resistor 36 connected in parallel with the zener diode 34. The adjustable voltage from the source 30 is taken from the potentiometer slider 38 which is adjusted or preset by the physician so that the output corresponds to the physical energy to be expended by the patient using the ergometer. To the other input 43 of the summation circuit 40 is applied a compensation voltage which is at least approximately proportional to the generator speed and thus to the mechanical friction in the generator. This compensation voltage which can be produced in a known manner by means of a tachometer generator, and is of polarity such that it will be subtracted from the voltage from the slider 38 in the summation circuit 40. The output 44 of the difference amplifier 26 is connected with the base 48 of transistor 20 so that the resistance of the emitter-collector path of the transistor is varied until the signal on line 24 which corresponds to the actual energy output coincides with the signal on line 28 which corresponds to the desired energy output of the generator except for the control deviation.

The circuit arrangements associated with the other two stator windings are identical and thus only the stator winding 12' and the associated circuitry are shown. A rectifier circuit 14' whose direct voltage output terminals 16' are connected with a load resistance, is also connected to the stator winding 12'. As with the load for winding 12, the load for winding 12' consists again of a heavy duty fixed resistor 18' and a transistor 20' whose emitter collector path is connected in series with resistor 18'. The base 48' of transistor 20' is coupled with the output 44 of the control amplifier 26 which also controls transistor 20. Resistors 50, 50' may be connected in series, with the lines to the bases 48,48' respectively for decoupling purposes. Line 52 leads to the base of a third transistor (not shown) and to the circuit associated with the third stator winding (not shown) which is constructed in the same manner as the circuit associated with the stator winding 12'.

Resistors 18, 18' and transistors 20, 20' are so dimensioned that they can absorb or dissipate the necessary power. This represents no difficulty in practice because very economical low-frequency power transistors are available which have collector power dissipations well above 100 watts, and the maximum physical energy which a human being can expend for a significant period of time exceeds 400 watts only in exceptional cases.

In the embodiment shown in FIG. 3 there is again employed a three-phase generator 10a to whose output lines a rectifier circuit 14a is connected which, however, contrary to the rectifier circuits of the embodiment shown in FIG. 2, need furnish only a very small power output. In this embodiment the load for the generator 10a is directly connected to the a.c. output terminals of the generator and consists of a controllable device, i.e. a thyristor circuit 15, which feeds a single load resistor 18a. The thyristor circuit 15 may be constructed in a known manner and regulates the electric power transmitted to the load resistor 18a according to a control voltage which is applied to it through a line 24a. As disclosed by S. Denyer in ELECTRONIC ENGINEERING, May 1970 pages 88 to 92 ("Thyristor Controlled D.C. Motors") the same principle may be used, instead of controlling the current through the armature, to feed the load 18 over a phase - controlled thyristor (SCR) which is commutated or switched by the rectified half-cycles of the generated a.c. voltage. The control voltage for the thyristor circuit 15 is produced by a circuit arrangement 30a which may be constructed in the same manner as the circuit 30 of FIG. 2. Here, too, the control voltage can also be combined in a summation circuit 40a with a compensation voltage from a terminal 43a. The control voltage on line 24a controls in a known manner the current flow angle of the thyristors.

The arrangement for producing the compensation voltage at terminals 43 and 43a may contain a tachometer generator 19 which is coupled with the patient drive device 17 for the ergometer. The output of the tachometer generator is used as the input for both a speed indicator instrument 21 and, a rectifier circuit 23 whose output is connected with terminal 43a via a setting resistor 25. Such circuits are known in principle, e.g. see the above-mentioned Swiss Pat. No. 432,045.

The described embodiments may of course also be modified in various ways without exceeding the scope of the present invention. For example, the three stator windings of generator 10 may be connected with a three-phase rectifier circuit to whose d.c. output terminals is connected only a single circuit as is connected with terminals 16. Resistor 18 and transistor 20 must then of course have the appropriate power dissipation capability. Terminals 16, 16' may also be connected, for example, to the output terminals of a self-excited d.c. generator.

When particularly high requirements are placed on accuracy, the circuits connected with the different stator windings may each contain a multiplier circuit and a control amplifier so that then only the power preselect circuit 30 and the compensation circuit 40, 42 of FIG. 2 etc. are common to all three phases. Such a circuit is shown in FIG. 4. Additionally, each phase may have its own associated multiplier circuit, the output signals of which are then fed over summing resistors to the one input of a control amplifier which controls the variable members of the respective control circuits.

Instead of utilizing transistors and thyristors as the controllable devices in series with the load resistor it is also possible to use magnetic amplifiers as the controllable members in the load circuit.

Figure 5:
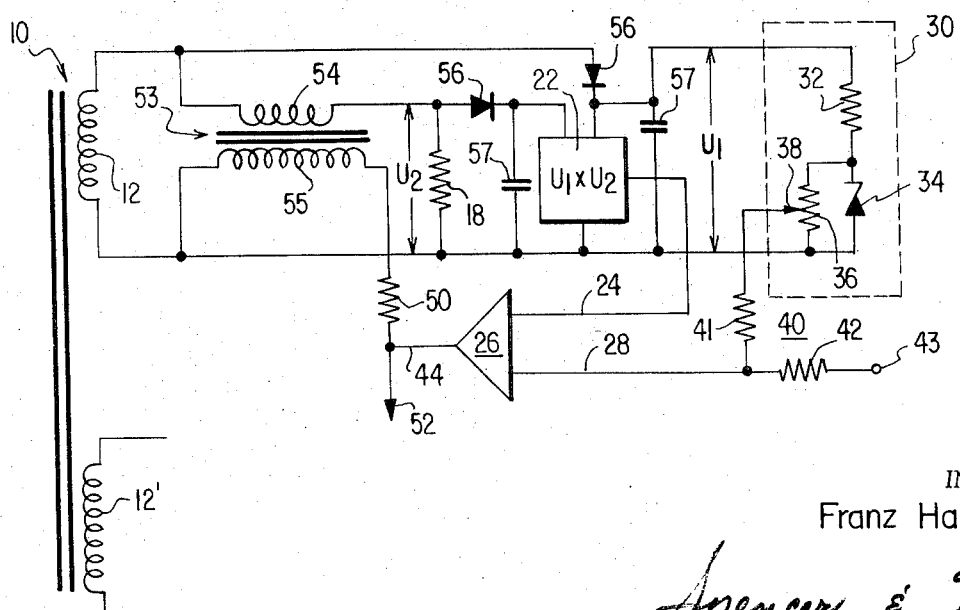
FIG. 5 is a circuit diagram of a portion of a dynamo ergometer according to a third embodiment of the present invention.

A circuit diagram of an embodiment of the invention utilizing a magnetic amplifier is shown in FIG. 5. A primary winding 54 of a saturable reactor 53 comprising a magnetic amplifier is connected in series with load resistor 18 to enable control of the power dissipated in resistor 18. No rectifiers are used in front of the load resistor but $U_1$ and the voltage $U_2$ fed to the multiplier circuit 22 are rectified and smoothed by diodes 56 and capacitors 57 to provide a proportional d.c. signal. The circuit is very similar to FIG. 2 with the exception that the signal at the output 44 of amplifier 26 is driving a secondary winding 55 of the saturable reactor 53 rather than a transistor. The output signal of differential amplifier 26 will control the degree of saturation of the core of the reactor 53 and, thus, change the impedance of serially connected winding 54 and resistor 18 acting as load in a manner, very similar to the transistors used in the previously described embodiment as d.c. controlling devices, Three saturable reactors or transductors may be controlled by one common control circuit or by three independent control circuits similar to FIG. 4, one transductor being provided for each phase. FIG. 5 shows the circuitry for one phase only, the circuits for the other two phases of the three - phase a.c. voltage generated may be identical with the circuit shown.

It will be understood that the above description of the present invention is susceptible to various modifications, changes and adaptations, and the same are intended to be comprehended within the meaning and range of equivalents of the appended claims.

I claim:

1. In a dynamo ergometer having an electrical generator means having at least d.c. output terminals; means driven by the patient to be examined for driving said generator means; a load resistance coupled to the output terminals of said generator means for absorbing the electrical energy produced by said generator means; and a control circuit means for controlling the energy absorbed by said load resistance to a value such that the physical energy transmitted by the patient to said drive means has an adjustable value which is substantially independent of the speed of rotation of said generator means; the improvement wherein said load resistance includes the series connection of a fixed resistor and a variable resistance controllable device; and wherein said control circuit means is coupled to the output terminals of said generator means and derives all of its operating power therefrom, and is connected to said controllable device to vary the resistance thereof.

2. The ergometer as defined in claim 1 wherein said generator means includes a self-excited generator.

3. The ergometer as defined in claim 1 wherein said electrical generator means comprises an a.c. generator having a rectifier circuit connected to its a.c. voltage output terminals.

4. The ergometer as defined in claim 1 wherein said electrical generator means is a d.c. voltage generator.

5. The ergometer as defined in claim 1 wherein said load resistance and said control circuit means are connected to the d.c. output terminals of said generator means; and wherein said control circuit means contains; a first means for providing a signal which is proportional to the electric energy absorbed by said load resistance; a second means for producing a signal proportional to the desired value of the electrical energy to be produced by the generator; and a control amplifier connected to the outputs of said first and second means for providing an error signal at its output dependent upon the deviation of the output signal of said first means from the output signal of said second means, the output of said control amplifier being connected to said controllable device to control the resistance thereof.

6. The ergometer as defined in claim 5 wherein said controllable device is a power transistor having its emitter-collector current path connected in series with said resistor, and its base connected to the output of said control amplifier.

7. The ergometer as defined in claim 5 wherein said electrical generator means includes a three-phase a.c. generator with three pairs of three-phase output terminals, and a separate rectifier circuit connected to each pair of said generator output terminals; and wherein there are three of said load resistances, the d.c. output terminals of each of said rectifier circuits being connected to a separate one of said load resistances.

8. The ergometer as defined in claim 7 wherein the output signal from a single one of said control circuit means is connected to and controls the controllable device in all of said three load resistances.

9. The ergometer as defined in claim 7 wherein said control circuit means includes a plurality of said first means and said control amplifiers with a different one of said first means and said control amplifiers being provided for each output phase of said generator means.

10. The ergometer as defined in claim 5 wherein said means for producing a signal proportional to the energy absorbed by the load includes a multiplier circuit having a first input to which is fed a signal which is proportional to the voltage across said load resistance, and a second input to which is fed a signal corresponding to the current flowing through said load resistance.

11. The ergometer as defined in claim 5 wherein said means for producing a signal corresponding to the desired value of the electrical energy to be produced by the generator contains a first circuit arrangement for producing a constant voltage whose output is adjustable to a value corresponding to the total energy to be expended by the patient, a second circuit arrangement for producing a signal proportional to the speed of said generator, and hence to the frictional energy losses in said generator, and a summing circuit for providing an output signal equal to the difference between said speed-proportional signal and said constant voltage.

12. The ergometer as defined in claim 1 wherein said generator means is an a.c. generator having a rectifier circuit connected. to its a.c. voltage output terminals; wherein said load resistance is connected to the a.c. voltage output terminals of said generator and wherein said control circuit means is connected to the d.c. voltage output terminals of said rectifier circuit.

13. The ergometer as defined in claim 12 wherein said control circuit means comprises a first circuit arrangement for producing a constant voltage whose output is adjustable to a value corresponding to the total energy to be expended by the patient, a second circuit arrangement for producing a signal proportional to the speed of said generator, and hence to the frictional energy losses in said generator, and a summing circuit for providing an output signal equal to the difference between said speed-proportional signal and said constant voltage.

14. The ergometer as defined in claim 12 wherein said controllable device contains at least one thyristor whose current flow angle is controlled by an output signal furnished by said control circuit means.

15. The ergometer as defined in claim 14 wherein said generator means includes a three-phase a.c. generator, and wherein said load resistance includes a single load resistor connected to the a.c. output terminals of said generator via a three-phase thyristor circuit.

16. The ergometer as defined in claim 13 wherein said controllable device comprises a magnetic amplifier.

17. In a dynamo ergometer having an electrical generator means having at least d.c. output terminals; means driven bY the patient to be examined for driving said generator means; a load resistance means, coupled to the output terminals of said generator means, for absorbing the electrical energy produced by said generator means; and a control circuit means for controlling the energy absorbed by said load resistance means to a value such that the physical energy transmitted by the patient to said drive means has an adjustable value which is substantially independent of the speed of rotation of said generator means; the improvement wherein said control circuit means is coupled to the output terminals of said generator means and derives all of its operating power therefrom; wherein said electrical generator means includes a three-phase a.c. generator with three pairs of three-phase output terminals, and a separate rectifier circuit connected to each pair of said generator output terminals; and wherein there are three of said load resistance means with the d.c. output terminals of each of said rectifier circuits being connected to a separate one of said load resistance means.

* * * * *